United States Patent

(12) United States Patent
Iguchi

(10) Patent No.: US 10,809,103 B2
(45) Date of Patent: Oct. 20, 2020

(54) BENDING MEASUREMENT APPARATUS, IMAGING APPARATUS, PROJECTION APPARATUS AND PROJECTION IMAGING APPARATUS USING THE SAME, AND BENDING MEASUREMENT METHOD COMPRISING A WAVEFRONT MEASURING DEVICE

(71) Applicant: OLYMPUS CORPORATION, Hachioji-shi, Tokyo (JP)

(72) Inventor: Yoshihito Iguchi, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/735,332

(22) Filed: Jan. 6, 2020

(65) Prior Publication Data

US 2020/0141768 A1    May 7, 2020

Related U.S. Application Data

(63) Continuation of application No. PCT/JP2017/025018, filed on Jul. 7, 2017.

(51) Int. Cl.
*G01B 11/24*       (2006.01)
*G01D 5/353*       (2006.01)

(52) U.S. Cl.
CPC .......... *G01D 5/3538* (2013.01); *G01B 11/24* (2013.01); *G01D 5/35383* (2013.01)

(58) Field of Classification Search
CPC ... G01B 11/24; G01D 5/3538; G01D 5/35383
(Continued)

(56) References Cited

U.S. PATENT DOCUMENTS 3,622,794 A * 11/1971 Pond .................... G03H 1/0486
                                                       250/201.9
5,956,447 A    9/1999 Zel'Dovich et al.
(Continued)

FOREIGN PATENT DOCUMENTS

JP        H0836138 A    2/1996

OTHER PUBLICATIONS

English Language translation of an International Preliminary Report on Patentability (IPRP) dated Jan. 16, 2020 issued in International Application No. PCT/JP2017/025018.
(Continued)

*Primary Examiner* — Que Tan Le
(74) *Attorney, Agent, or Firm* — Holtz, Holtz & Volek PC

(57) ABSTRACT

A bending measurement apparatus includes a first multimode fiber, a wavefront input apparatus, a first wavefront measurement device, and a processor. The wavefront input apparatus inputs a first wavefront to the first multimode fiber as an input wavefront. The first wavefront measurement device measures an output wavefront outputted from the first multimode fiber as a measured wavefront. The processor select correspondence information which corresponds to the measured wavefront. The correspondence information shows a correspondence relationship between the input wavefront and the output wavefront. The processor sets the bending amount corresponding to the selected correspondence information as a current bending amount of the first multimode fiber.

18 Claims, 7 Drawing Sheets

(58) Field of Classification Search
USPC .............. 250/227.15, 227.16, 208.1, 201.9
See application file for complete search history.

(56) References Cited

U.S. PATENT DOCUMENTS

| | | |
|---|---|---|
| 10,018,819 B2 | 7/2018 | Iguchi et al. |
| 10,042,148 B2 | 8/2018 | Iguchi |
| 10,379,335 B2 | 8/2019 | Iguchi |
| 2015/0346474 A1 | 12/2015 | Iguchi |
| 2017/0160198 A1 | 6/2017 | Iguchi |

OTHER PUBLICATIONS

International Search Report (ISR) dated Sep. 26, 2017 (and English translation thereof), issued in International Application No. PCT/JP2017/025018.

Written Opinion of the International Searching Authority dated Sep. 26, 2017 issued in International Application No. PCT/JP2017/025018.

Katagiri, et al., "Proposal of Remote Fluorescence Imaging Based on Output Speckle Pattern of Multimode Fiber", The Laser Society of Japan, Aug. 5, 2016, pp. 29-33.

Ploschner, et al., "Seeing through chaos in multimode fibres", Nature Photonics, vol. 9, No. 8, Aug. 2015, pp. 529-535.

\* cited by examiner

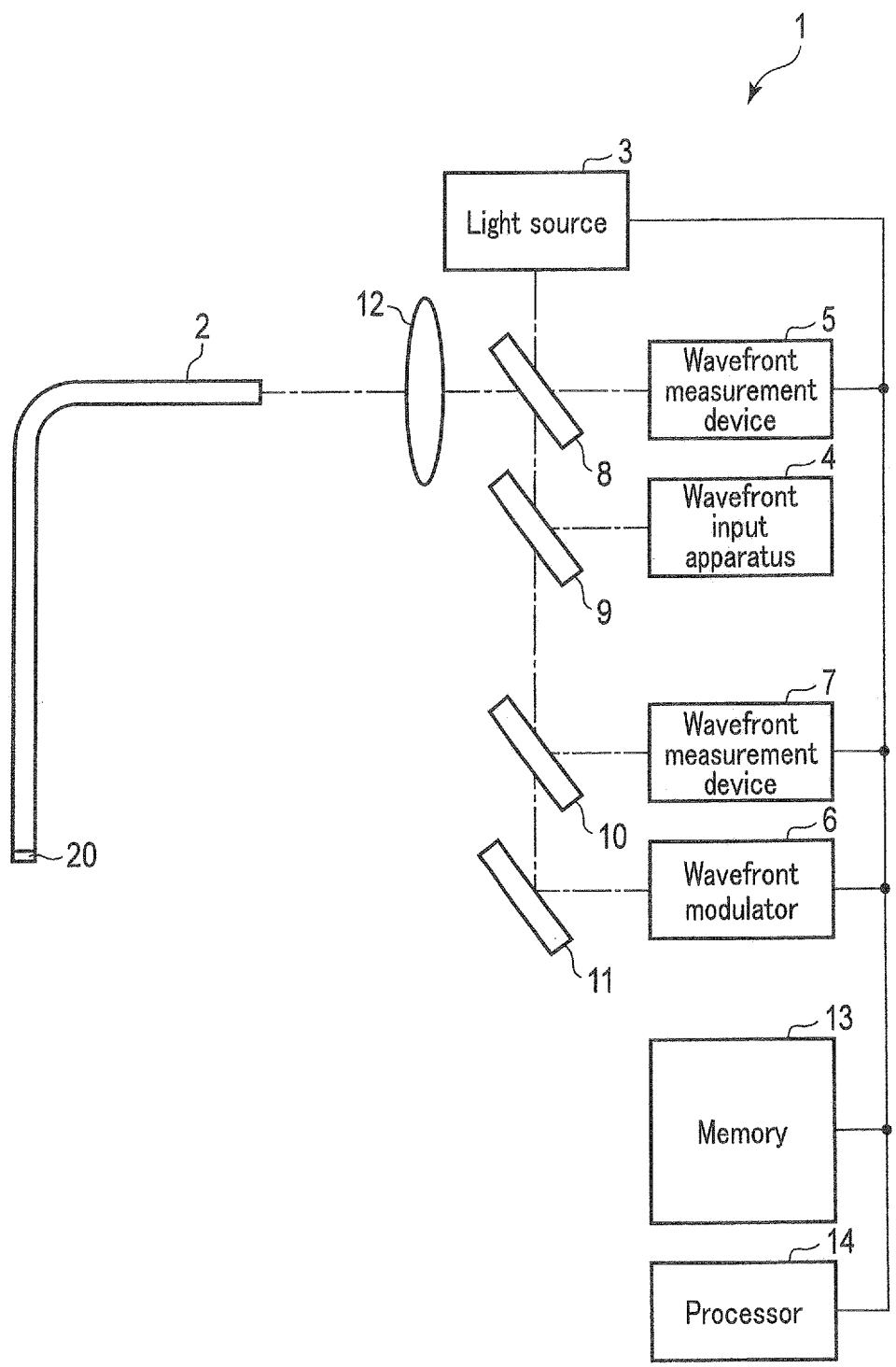
F I G. 1

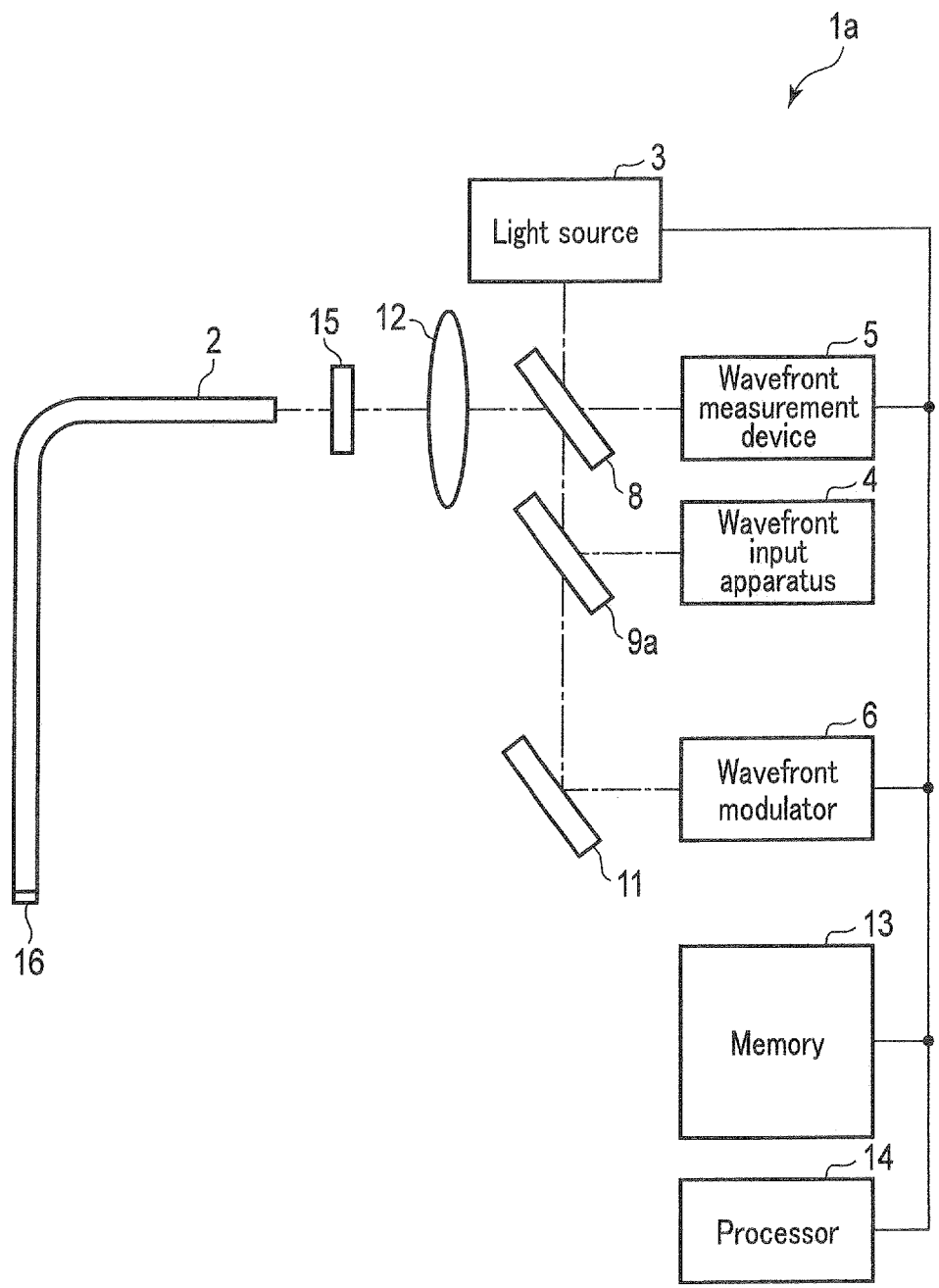
F I G. 6

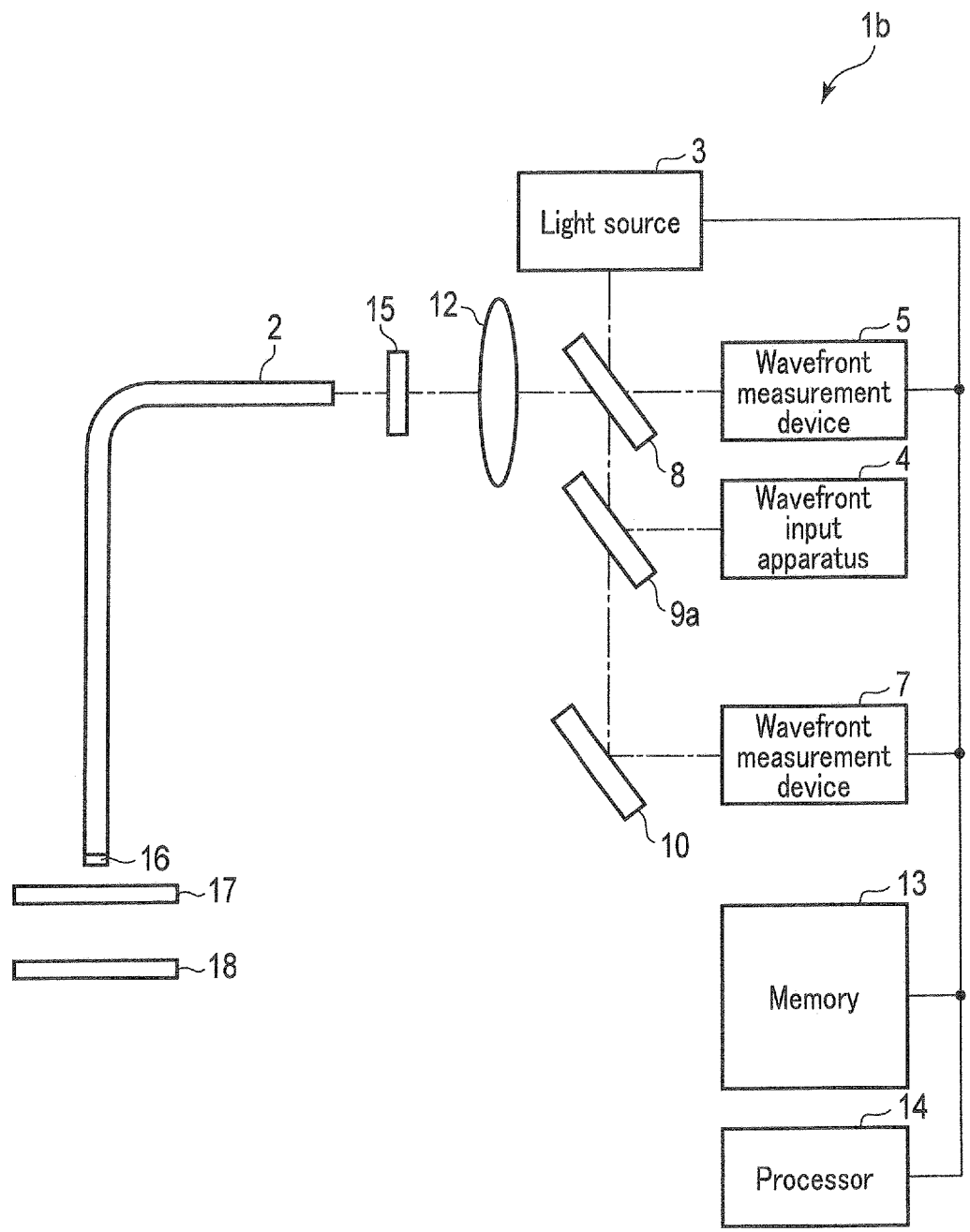
F I G. 7

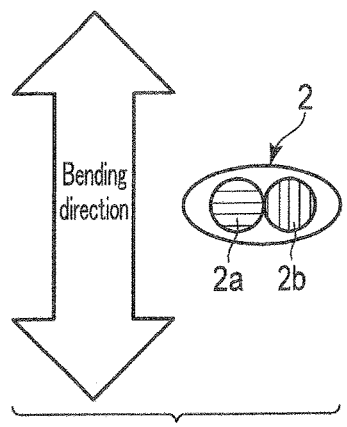
F I G. 8
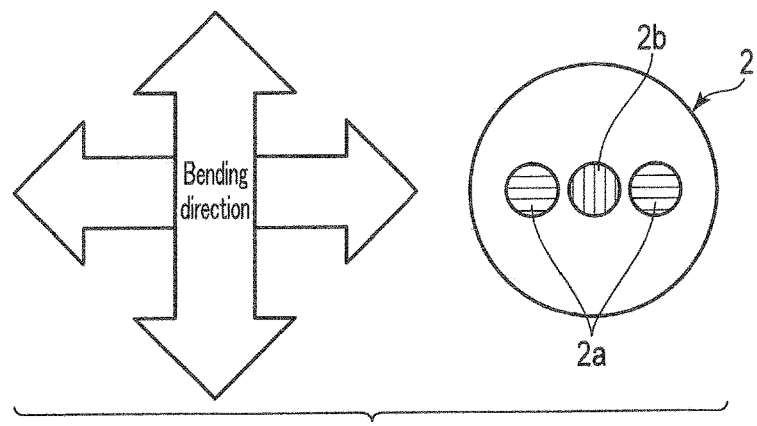
F I G. 9
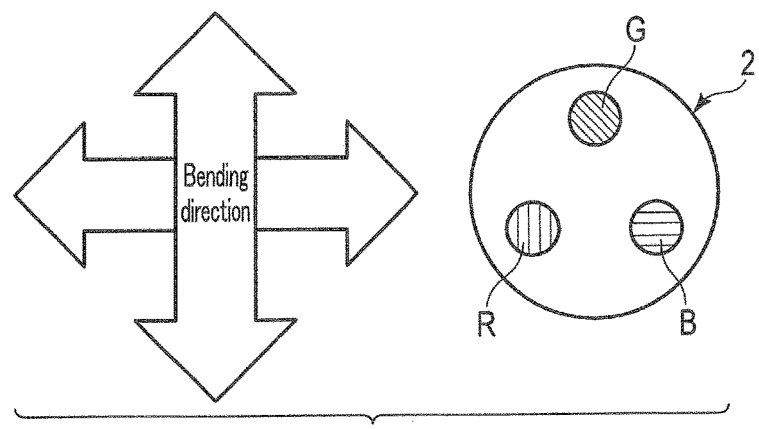
F I G. 10

BENDING MEASUREMENT APPARATUS, IMAGING APPARATUS, PROJECTION APPARATUS AND PROJECTION IMAGING APPARATUS USING THE SAME, AND BENDING MEASUREMENT METHOD COMPRISING A WAVEFRONT MEASURING DEVICE

CROSS-REFERENCE TO RELATED APPLICATIONS

This application is a Continuation Application of PCT Application No. PCT/JP2017/025018, filed Jul. 7, 2017, the entire contents of which are incorporated herein by reference.

FIELD

The embodiments relate generally to a bending measurement apparatus for a multimode fiber, imaging apparatus, projection apparatus and projection imaging apparatus using the same and a bending measurement method.

BACKGROUND

An optical fiber has a part with high refractive index called a core and a part with low refractive index called a clad disposed surrounding the core. A light input to an optical fiber having such structure propagates by total internal reflection, etc. at the boundary between the core and the clad. In this type of optical fiber, the optical fiber comprising multiple propagation modes (light paths) is called a multimode fiber.

In recent years, various techniques for performing optical image transmission such as high-definition optical imaging or optical projection using a single multimode fiber are proposed. More specifically, Martin Ploschner et al., "Seeing through chaos in multimode fibres", Nature Photonics 9, 529-535 (2015) doi:10.1038/nphoton.2015.112 proposes performing optical image transmission using multimode fiber in accordance with a transmission function of a bent multimode fiber by obtaining a transmission function of the straight multimode fiber, correctly modeling parameters such as length and refractive index distribution of multimode fibers to be used in order to calculate the transmission function of the bent multimode fibers from a bending amount of multimode fiber measured by a camera and the transmission function of the straight multimode fiber. In such technique, accurate optical imaging transmission can be performed even for a bent multimode fiber.

SUMMARY

According to an aspect, a bending measurement apparatus comprises: a first multimode fiber; a wavefront input apparatus configured to input a first wavefront to the first multimode fiber as an input wavefront; a first wavefront measurement device configured to measure an output wavefront outputted from the first multimode fiber by propagating through the first multimode fiber as a measured wavefront; and a processor configured to: select correspondence information which corresponds to the measured wavefront from correspondence information, the correspondence information showing a correspondence relationship between the input wavefront and the output wavefront, and the correspondence information obtained for each bending amount of the first multimode fiber; and set the bending amount corresponding to the selected correspondence information as a current bending amount of the first multimode fiber.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 1 is a diagram showing a constitution of one example of a projection imaging apparatus comprising a bending measurement apparatus according to one embodiment.

FIG. 6 is a diagram showing a constitution of one example of a projection apparatus according to a modification example 1.

FIG. 7 is a diagram showing a constitution of one example of an imaging apparatus according to the modification example 1.

FIG. 8 is a diagram showing a first configuration example of a multimode fiber 2 of modification example 2.

FIG. 9 is a diagram showing a second configuration example of the multimode fiber 2 of the modification example 2.

FIG. 10 is a diagram showing a configuration of a multimode fiber 2 of modification 3.

DETAILED DESCRIPTION

Figure 2:
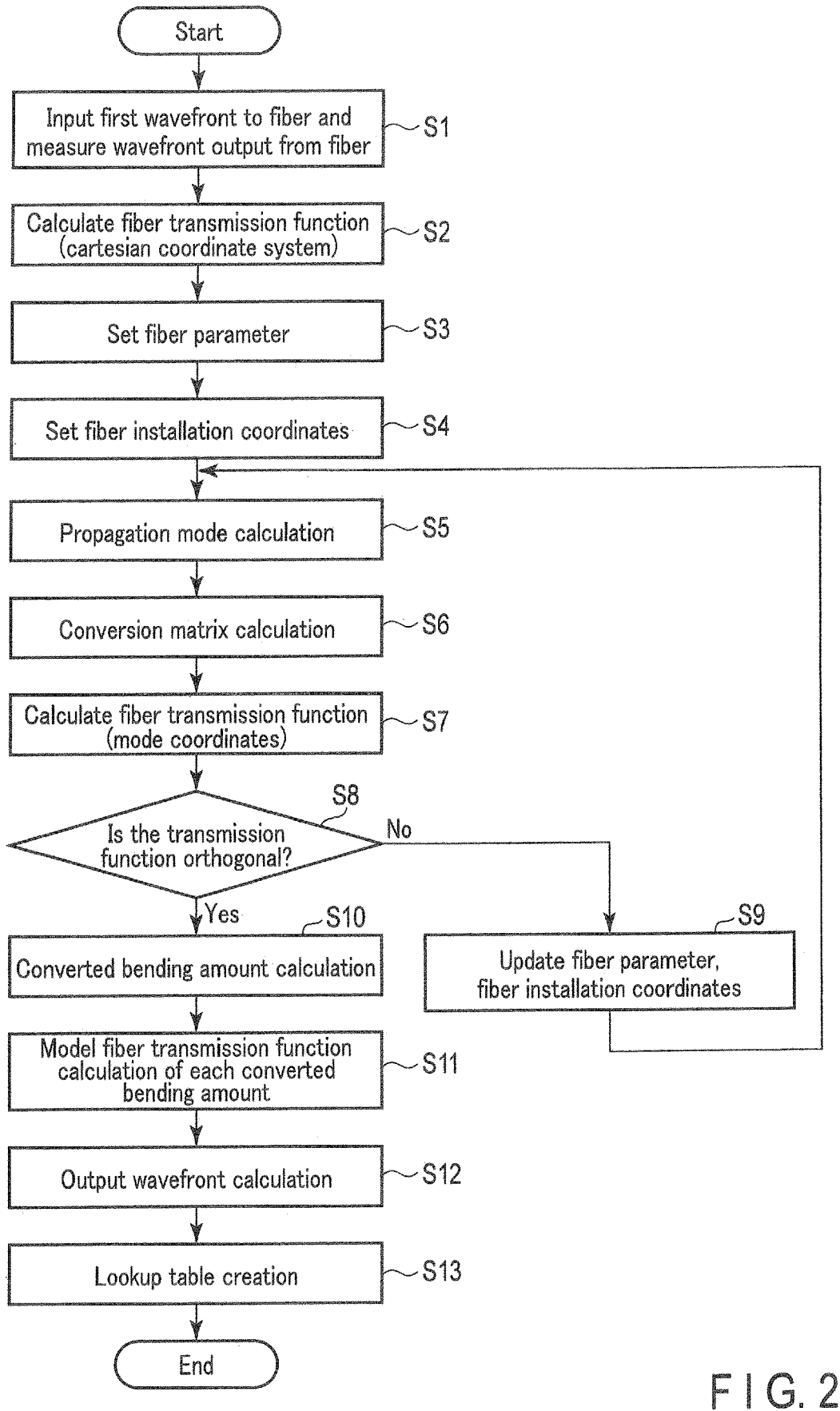
FIG. 2 is a flowchart showing a process for creating a lookup table.

Hereinafter, an embodiment will be described with reference to the drawings. FIG. 1 is a diagram showing a constitution of one example of a projection imaging apparatus comprising a bending measurement apparatus according to one embodiment. The projection imaging apparatus 1 shown in FIG. 1 is configured to perform bending measurement, projection operation, and imaging operation of the multimode fiber 2 by using a single multimode fiber 2 which is a first multimode fiber. As shown in FIG. 1, the projection imaging apparatus 1 comprises the multimode fiber 2, a light source 3, a wavefront input apparatus 4, a wavefront measurement device 5, a wavefront modulator 6, a wavefront measurement device 7, a half mirror 8, a half mirror 9, a half mirror 10, a half mirror 11, a lens 12, a memory 13 and a processor 14.

The multimode fiber 2 is a single optical fiber constituted to allow multiple modes (light paths) of an input light to propagate through. A core diameter of the multimode fiber 2 is larger compared to a core diameter of a single mode fiber. The number of propagation modes is decided by a wavelength of an input light, a number of openings of the multimode fiber and the core diameter. Further, the multimode fiber 2 according to the present embodiment can be a step index multimode fiber or a grated index multimode fiber.

In the following explanation, an end surface near the lens 12 of the multimode fiber 2 will be a near-end surface (first end surface) and an end surface of a farther side from the lens 12 of the multimode fiber 2 will be a far-end surface (second surface). Further, in the following explanation, a wavefront input to a near-end surface of the multimode fiber 2 will be described as an input wavefront. More specifically, the input wavefront outputted from the wavefront input apparatus 4 is incident on the near-end surface of the multimode fiber 2. On the other hand, the far-end surface of the multimode fiber 2 is provided on a wavelength selective coat 20. The wavelength selective coat 20 selectively reflects light having a first wavelength $\lambda 1$ (in other words, the reflectance for the first wavefront having the first wavelength $\lambda 1$ is larger than 0%) and is a coating material that passes light other than the first wavelength $\lambda 1$. The light having the first wavelength $\lambda 1$ is a light that is used for the bending amount measurement of the multimode fiber 2, and has a different wavelength from at least a second wavelength $\lambda 2$ and a third wavelength $\lambda 3$. The light of the second wavelength $\lambda 2$ is a light used for projection. The light of the second wavelength $\lambda 2$ is determined by the image to be projected. The light of the third wavelength $\lambda 3$ is a light used for imaging and is a light that is input from the subject. Furthermore, though the first wavelength $\lambda 1$ differs from the second wavelength $\lambda 2$ and the third wavelength $\lambda 3$, the second wavelength $\lambda 2$ and the third wavelength $\lambda 3$ can be different or can be the same.

The light source 3 is a light source that is constituted to output a light having at least two types of wavelengths, such as light having first wavelength $\lambda 1$ and light having the second wavelength $\lambda 2$.

The wavefront input apparatus 4 changes and outputs the light input through the half mirror 9 to a light having a predetermined wavefront. The light having this predetermined wavefront is for example, a planar wave. In this case, the wavefront input apparatus 4 is for example, constituted by a planar mirror.

The wavefront measurement device 5 as a first wavefront measurement device is a measurement device that measures the wavefront (light intensity distribution and phase distribution) of the light input through the half mirror 8. The wavefront measurement device 5 is for example, a Shack-Hartmann wavefront sensor. Further, though a detailed explanation will be hereinafter given, in the present embodiment, the light having the first wavelength $\lambda 1$ is incident on the near-end surface of the multimode fiber 2, and is outputted from the near-end surface of the multimode fiber 2 by reflecting on the wavelength selective coat 20 provided on the far-end surface of the multimode fiber 2 after propagating through the multimode fiber 2. The wavefront measurement device 5 measures the output wavefront which is a wavefront outputted from the near-end surface of the multimode fiber 2. Moreover, in the following explanation, the wavefront measured by the wavefront measurement device 5 is described as the measurement wavefront.

The wavefront modulator 6 is for example, a spatial light modulator, and modulates and outputs the light wavefront incident on the half mirror 11. The wavefront modulator 6 is used for projection operation.

The wavefront measurement device 7, as a second wavefront measurement device, is a measurement device that measures the wavefront of the light input through the half mirror 10. The wavefront measurement device 7 is for example, a Shack-Hartmann wavefront sensor. The wavefront measurement device 7 is used for imaging operation. Instead of the wavefront measurement device 7, the wavefront measurement device 5 can be used in a time sharing manner for bending measurement and imaging operation.

The half mirror 8 is a half mirror constituted to pass a part of the input light and reflect a part of the light.

The half mirror 9 is a half mirror constituted to pass a part of the input light and reflect a part of the light. Instead of the half mirror 9, a dichroic mirror having the wavelength selective property of reflecting the light of the first wavelength $\lambda 1$ and passing the light of other wavelengths can be used.

The half mirror 10 is a half mirror constituted to pass a part of the input light and reflect a part of the light. Instead of the half mirror 10, a dichroic mirror having the wavelength selective property of reflecting the light of the third wavelength $\lambda 3$ and passing the light of other wavelengths can be used.

The half mirror 11 is a half mirror constituted to pass a part of the input light and reflect a part of the light. Instead of the half mirror 11, a dichroic mirror having the wavelength selective property of reflecting the light of the second wavelength $\lambda 2$ and passing the light of other wavelengths can be used.

The lens 12 collects light input through the half mirror 8 and inputs it to the end surface of the multimode fiber 2. The lens 12 inputs light outputted from the end surface of the multimode fiber 2 to the half mirror 8.

The memory 13 is constituted by a ROM that can be, for example, electrically rewritten. The memory 13 stores program necessary to operate the processor 14. Further, the memory 13 stores the length, core diameter, clad diameter, refractive index distribution and position information of the multimode fiber 2 as known parameters. The length of the multimode fiber 2 is the length from the near-end surface to the far-end surface of the multimode fiber 2. The core diameter is a radius (or diameter) of the core constituting the multimode fiber 2. The clad diameter is a radius (or diameter) of the clad constituting a multimode fiber 2. The refractive index distribution is a distribution of the refractive index between the clad-core of the multimode fiber 2. The position information represents the displacement of the multimode fiber 2 in the Cartesian coordinate system. In addition, the memory 13 stores a lookup table of transmission function for every bending amount of the multimode fiber 2. The transmission function is a function that shows a correspondence relation between the input wavefront and output wavefront of the multimode fiber 2. Since the input wavefront and the output wavefront are represented by a matrix showing the complex amplitude for each coordinates, the transmission function is also represented by a matrix.

The processor 14 controls the operation of the light source 3, the wavefront input apparatus 4, the wavefront measurement device 5, the wavefront modulator 6, and the wavefront measurement device 7 in accordance with a program stored in the memory 13. In addition, the processor 14 performs various calculations such as calculating the bending amount of the multimode fiber 2 based on the wavefront measured by the wavefront measurement device 5. The processor 14 is for example, a CPU. The processor 14 can be an ASIC, FPGA, etc.

In the following description, the operation of the projection imaging apparatus 1 in the present embodiment will be explained. First, a method of creating a lookup table in the projection imaging apparatus 1 is explained. FIG. 2 is a flowchart showing an example method of creating the lookup table. In the process of FIG. 2, there is a suitable process for when the multiple bending amount of the multimode fiber 2 cannot be actually measured from the exterior. Since the bending amount cannot be actually measured from the exterior, the transmission function of the multimode fiber is calculated in a state of optimizing (modeling) the fiber parameter and the installation coordinates of the multimode fiber. Further, the transmission function for each assumed bending amount is calculated from the transmission function of such modeled state. It is desirable that the process of FIG. 2 is performed in a state where there is no bend in the multimode fiber 2.

In step S1, the processor 14 inputs a first wavefront having the first wavelength λ1 on the multimode fiber 2. The processor 14 obtains a wavefront from the wavefront measurement device 5. Thus, the processor 14 instructs the light source 3 to output light of the first wavelength λ1. With this instruction, the light source 3 outputs the light of the first wavelength λ1. A part of the light of the first wavelength λ1 outputted from the light source 3 passes through the half mirror 8, and is reflected at the half mirror 9 to be input to the wavefront input apparatus 4. In the wavefront input apparatus 4, the inputted light is for example, outputted as a planer wave. This planer wave reflects at both the half mirror 9 and the half mirror 8. The planer wave reflected at the half mirror 8 is inputted as the first wavefront to the near-end surface of the multimode fiber 2 through the lens 12. The first wavefront that propagates through the multimode fiber 2 is reflected at the wavelength selective coat 20 provided at the far-end surface of the multimode fiber 2. The first wavefront reflected at the wavelength selective coat 20 once again propagates through the multimode fiber 2 and is output from the near-end surface of the multimode fiber 2. The first wavefront outputted from the near end of the multimode fiber 2 passes through the lens 12 and is input to the wavefront measurement device 5 by passing through the half mirror 8. The processor 14 obtains information (light intensity distribution and phase distribution) of the measured wavefront measured at the wavefront measurement device 5.

In step S2, the processor 14 calculates the transmission function in the Cartesian coordinate system from the first wavefront (input wavefront) input from the near-end surface of the multimode fiber 2 and a wavefront (output wavefront) outputted from the multimode fiber 2. When calculating the transmission function, the processor 14 sets the Cartesian coordinates to each of the input wavefront and the output wavefront and obtains a complex amplitude for each coordinates. In addition, the complex amplitude for each coordinates of the input wavefront is considered to be provided in advance. On the other hand, the complex amplitude of each coordinates of the output wavefront is obtained from the information of the measured wavefront measured in the wavefront measurement device 5. Thus, the transmission function m in the Cartesian coordinate system is defined by the following (equation 1) relationship.

$$E_{dout}=mE_{din} \quad (\text{equation 1})$$

Here, the $E_{din}$ represents the input wavefront (complex amplitude of each coordinates) in the Cartesian coordinate system and $E_{dout}$ represents the output wavefront (complex amplitude of each coordinates) in the Cartesian coordinate system.

In step S3, the processor 14 sets the fiber parameter (length, core diameter, clad diameter, refractive index distribution) of the multimode fiber 2. More specifically, the length, core diameter, clad diameter, and refractive index distribution of the multimode fiber 2 are set depending on the specification of the multimode fiber 2 to be used. The information of the specification of the multimode fiber 2 is for example, input by the user.

In step S4, the processor 14 sets the installation coordinates (position information) of the multimode fiber 2. More specifically, the processor 14 sets the installation coordinates of the multimode fiber 2 by obtaining the coordinates in the Cartesian coordinate system of the current multimode fiber 2.

In step S5, the processor 14 calculates the propagation mode of the multimode fiber 2 by using the length, core diameter, clad diameter, refractive index distribution, and installation coordinates of the multimode fiber 2. By calculating the propagation mode, the input wavefront and the output wavefront represented by the Cartesian coordinate system can be represented in the mode coordinate system.

In step S6, the processor 14 calculates a transformation matrix for transforming the input wavefront and the output wavefront of the Cartesian coordinate system to the input wavefront and the output wavefront of the mode coordinate system.

In step S7, the processor 14 calculates the transmission function in the mode coordinate system from the transmission function in the Cartesian coordinate system and transformation matrix. The transmission function M in the mode coordinate system is defined by the following (equation 2) relationship.

$$E_{mout}=ME_{min} \quad (\text{equation 2})$$

Here, the $E_{min}$ represents the input wavefront (complex amplitude of each coordinates) in the mode coordinate system and $E_{mout}$ represents the output wavefront (complex amplitude of each coordinates) in the mode coordinate system. Further, Assuming that the transformation matrix is T, the $E_{min}$, $E_{mout}$, and M are represented in the following manner. The transmission function M is calculated by the relationship indicated in (equation 3).

$$E_{min}=TE_{din}$$

$$E_{mout}=TE_{doutt}$$

$$M=TmT^{-1} \quad (\text{equation 3})$$

In step S8, the processor 14 determines whether or not the calculated transmission function M is orthogonal, in other words, whether the transmission function M is a diagonal matrix. The multimode fiber possesses the feature of each mode being orthogonal (inner product of different modes will be zero). Therefore, ideally, the transmission function M represented by the mode coordinates is a diagonal matrix. However, the transmission function M will not be a diagonal matrix if optimization is not performed due to variations in the fiber parameters or shift in the installation coordinate of the multimode fiber occurs due to the manufacturing error of the multimode fiber. The processing of step S7 is a processing for determining whether or not the optimization of the fiber parameter and installation coordinates of the multimode fiber has been performed by determining whether or not the transmission function M is a diagonal matrix. If it is determined in step S8 that the calculated transmission function M is not orthogonal, the process moves to step S9. If the calculated transmission function M is determined as being orthogonal in step S8, the processing moves to step S10.

In step S9, the processor 14 updates at least one of the length, core diameter, clad diameter, refractive index distribution, and installation coordinates of the currently set multimode fiber 2. Subsequently, the processing returns to step S5. In that case, the transmission function M is recalculated based on the updated fiber parameter and installation coordinates. In other words, the processing of steps S5 to S9 are repeated until the transmission function M is orthogonal.

In step S10 when it is determined that the fiber parameter and the installation coordinates are optimized in step S8, the processor 14 calculates a converted bending amount. The converted bending amount is an amount that converts the bending amount of the used multimode fiber 2 to a bending amount of the modeled multimode fiber which is a multimode fiber in a state where the fiber parameter and installation coordinates are optimized. When the bending amount defined in the multimode fiber 2 is R and the converted bending amount is R', the converted bending amount R' is calculated by the following (equation 4). Here, the bending amount R can be one bending amount of the multimode fiber 2 or can be the bending amount of multiple parts.

$$R' = \xi R \quad \text{(equation 4)}$$

The $\xi$ of (equation 4) is a converted bending coefficient and is defined in the following (equation 5).

$$\xi = 1 - (1 - 2\sigma)(n-1)/n \quad \text{(equation 5)}$$

The $\sigma$ of (equation 5) is a Poisson's ratio of the multimode fiber 2 and n is a refractive index of the core of the multimode fiber 2.

In step S11, the processor 14 calculates the transmission function Mb for every converted bending amount from the transmission function M, the optimized fiber parameter and installation coordinates, as well as the converted bending amount R'.

In step S12, the processor 14 calculates the output wavefront $E_{mout}$ for every bending amount from the input wavefront $E_{min}$ and transmission function Mb.

In step S13, the processor 14 stores the bending amount R, output wavefront $E_{mout}$ and transmission function Mb as correspondence information showing the correspondence relationship between the input wavefront and output wavefront for every bending amount in a lookup table format in the memory 13. Thereafter, the processing shown in FIG. 2 ends. Here, the memory 13 can store bending amount R and transmission function Mb as correspondence information for every bending amount.

In the previous explained method of creating a lookup table, the transmission function of the bending state is calculated by assuming a state where the modeled multimode fiber is bent. By the above, even if the bending amount of the multimode fiber 2 is not actually measured, the transmission function for each bending amount can be stored in the memory 13 in a lookup table manner.

If the bending amount of the multimode fiber 2 can be actually measured by a camera, etc., the transmission function for each bending amount can be calculated from the input wavefront, the output wavefront, fiber parameter and installation coordinates of the multimode fiber and the actually measured bending amount. In this case, there is no need to perform the optimization of fiber parameters and installation coordinates.

Figure 3:
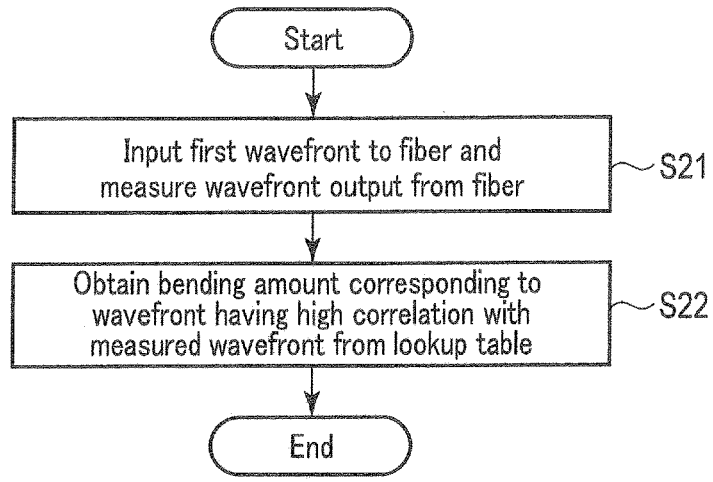
FIG. 3 is a flowchart showing a bending measurement method of a multimode fiber by the projection imaging apparatus.

FIG. 3 is a flowchart showing a bending measurement method of a multimode fiber 2 by the projection imaging apparatus 1. In step S21, the processor 14 inputs a first wavefront to the multimode fiber 2. The processor 14 obtains a wavefront from the wavefront measurement device 5. The processing of the step S21 is similar to that performed in step S1 of FIG. 2. Thus, an explanation will be omitted.

In step S22, the processor 14 selects an output wavefront with high correlation with the measured wavefront obtained from the wavefront measurement device 5 from the lookup table stored in the memory 13. Further, the processor 14 sets the bending amount R associated with the selected output wavefront to a bending amount of the current multimode fiber 2. Thereafter, the processing shown in FIG. 3 ends. When only the bending amount R and the transmission function Mb are associated and stored to the memory 13, the processor 14 calculates the transmission function from fiber parameter and the installation coordinates, input wavefront and the output wavefront obtained from the wavefront measurement device 5, and selects the transmission function with high correlation with the calculated transmission function. Further, the processor 14 sets the bending amount R associated with the selected transmission function to a bending amount of the current multimode fiber 2.

In the bending measurement method of the present embodiment, the output wavefront for each bending amount calculated from the model multimode fiber or the bending measurement measured from the actual measurement of the bending amount is stored as a lookup table. By the above, the bending amount of the multimode fiber 2 can be estimated without actually measuring the bending amount of the multimode fiber 2.

Therefore, in step S22 of FIG. 3, the bending amount is obtained from the lookup table. On the other hand, the processing of steps S7 to S11 of FIG. 2 can be performed instead of step S22. In other words, the calculation of transmission function for each bending amount can be performed during the measurement of the bending amount. In that case, the lookup table does not have to be stored in the memory 13. Thus, it is necessary to perform the optimization of the fiber parameter and installation coordinates.

Figure 4:
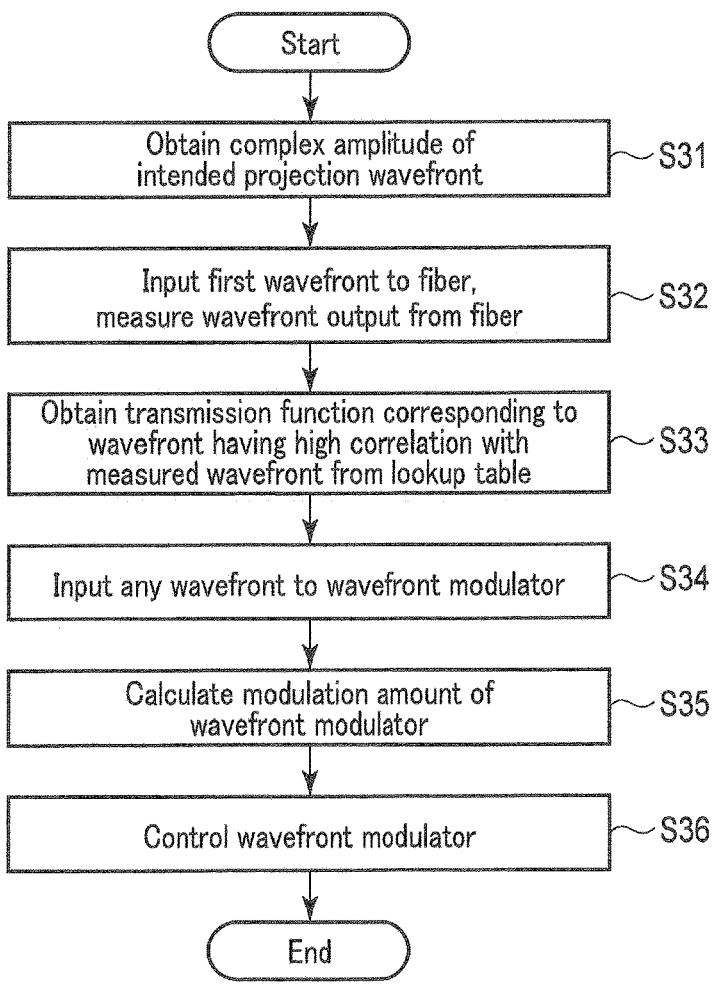
FIG. 4 is a flowchart showing a projection operation by the projection imaging apparatus.

FIG. 4 is a flowchart showing a projection operation by the projection imaging apparatus 1. In step S31, the processor 14 obtains information of complex amplitude of an intended projection wavefront. The condition of a projection light is for example, input by the user. The user for example, inputs the information of an image to be projected by the projection imaging apparatus 1 to the processor 14. The processor 14 obtains information of complex amplitude of the projection light based on the inputted image information.

In step S32, the processor 14 inputs a first wavefront on the multimode fiber 2. The processor 14 obtains a wavefront from the wavefront measurement device 5. The processing of the step S32 is similar to that performed in step S1 of FIG. 2. Thus, an explanation will be omitted.

In step S33, the processor 14 selects an output wavefront with high correlation with the measured wavefront obtained from the wavefront measurement device 5 from the lookup table stored in the memory 13. Further, the processor 14 obtains the transmission function associated with the selected output wavefront. Such transmission function is a transmission function that corresponds to the bending amount of the current multimode fiber 2.

In step S34, the processor 14 inputs an optional wavefront to the wavefront modulator 6. Thus, the processor 14 instructs the light source 3 to output light of the second wavelength λ2. A part of the light of the second wavelength λ2 outputted from the light source 3 passes through the half mirror 8, half mirror 9, and half mirror 10, and is reflected at the half mirror 11 to be input to the wavefront modulator 6.

In step S35, the processor 14 calculates the modulation amount of the wavefront modulator 6 from the transmission function obtained in step S33 and complex amplitude of the wavefront input to the wavefront modulator 6 in step S34 so that the wavefront having the complex amplitude of the intended projection light obtained in step S31 is output from the far-end surface of the multimode fiber 2. More specifically, the processor 14, based on the transmission function, calculates the input wavefront in which the wavefront having complex amplitude of intended projection light will be the output wavefront and calculates the modulation amount of the wavefront modulator 6 so that this input wavefront is output from the wavefront modulator 6. The transmission function obtained by the step S33 corresponds to a reciprocal transmission function of the multimode fiber 2. On the other hand, in the case of projection operation, the input wavefront propagates through the multimode fiber 2 without reciprocation. Therefore, the modulation amount of the wavefront modulator 6 is calculated after correcting the transmission function obtained in step S33 to a one-way transmission function. The one-way transmission function of each bending amount can then be stored as a lookup table in the memory 13.

In step S36, the processor 14 controls the modulation amount of the wavefront modulator 6 based on the calculated modulation amount. Thereafter, the processing shown in FIG. 4 ends. The wavefront outputted from the wavefront modulator 6 is reflected at the half mirror 11, passes through the half mirror 10 and the half mirror 9 and also reflects at the half mirror 8. The wavefront reflected at the half mirror 8 is inputted as the second wavefront to the near-end surface of the multimode fiber 2 through the lens 12. The second wavefront that propagates through the multimode fiber 2 passes through the wavelength selective coat 20 provided at the far-end surface of the multimode fiber 2. As a result, the second wavefront is projected.

In the projection operation according to the present embodiment, the wavefront modulator 6 can be controlled in accordance with the change of the transmission function depending on the bending amount of the multimode fiber 2 where the bending amount of the multimode fiber 2 is not actually measured. Thus, the wavefront in accordance with the inputted wavefront can be projected.

Therefore, in step S33 of FIG. 4, the transmission function is obtained from the lookup table. On the other hand, the processing of steps S7 to S11 of FIG. 2 can be performed instead of step S33. In other words, the calculation of transmission function for each bending amount measured during the projection operation can be performed. In that case, the lookup table does not have to be stored in the memory 13. Thus, it is necessary to perform the optimization of the fiber parameter and installation coordinates.

Figure 5:
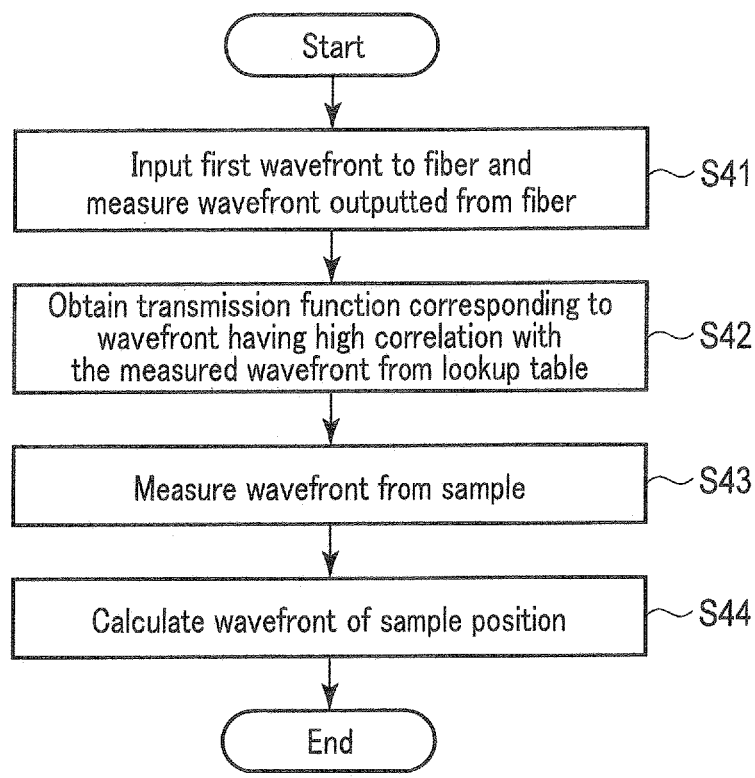
FIG. 5 is a flowchart showing an imaging operation by the projection imaging apparatus.

FIG. 5 is a flowchart showing an imaging operation by the projection imaging apparatus 1. In step S41, the processor 14 inputs a first wavefront to the multimode fiber 2. The processor 14 obtains a wavefront from the wavefront measurement device 5. The processing of the step S41 is similar to that performed in step S1 of FIG. 2. Thus, an explanation will be omitted.

In step S42, the processor 14 selects an output wavefront with high correlation with the measured wavefront obtained from the wavefront measurement device 5 from the lookup table stored in the memory 13. Further, the processor 14 obtains the transmission function associated with the selected output wavefront. Such transmission function is a transmission function that corresponds to the bending amount of the current multimode fiber 2.

In step S43, the processor 14 obtains a wavefront from the sample subject from the wavefront measurement device 7. The third wavefront from the subject is input to the far-end surface of the multimode fiber 2. The third wavefront input to the multimode fiber 2 passes through the wavelength selective coat 20 to propagate through the multimode fiber 2 and is output from the near-end surface of the multimode fiber 2. The third wavefront output from the near-end surface of the multimode fiber 2 passes through the lens 12, is reflected at the half mirror 8, passes through the half mirror 9 and is reflected at the half mirror 10 to be input to the wavefront measurement device 7. The processor 14 obtains information (light intensity distribution and phase distribution) of the wavefront measured at the wavefront measurement device 7.

In step S44, the processor 14 estimates the wavefront of the sample subject from the transmission function obtained in step S42 and the complex amplitude of the wavefront obtained from the wavefront measurement device 7 in the step S43. Thereafter, the processing shown in FIG. 5 ends. Thus, the processor 14 calculates the wavefront input to the multimode fiber 2 as a wavefront of the sample subject from the transmission function obtained in step S42 and the complex amplitude of the wavefront obtained from the wavefront measurement device 7 in step S43. The transmission function obtained by the step S42 corresponds to a reciprocal transmission function of the multimode fiber 2. On the other hand, in the case of imaging operation, the input wavefront propagates through the multimode fiber 2 without reciprocation. Therefore, the wavefront of the subject is calculated after correcting the transmission function obtained in step S42 to a one-way transmission function. The one-way transmission function of each bending amount can then be stored as a lookup table in the memory 13.

In the imaging operation according to the present embodiment, the wavefront of the sample subject can be estimated in accordance with the change of transmission function depending on the bending amount of the multimode fiber 2 even if the bending amount of the multimode fiber 2 cannot be actually measured.

Therefore, in step S42 of FIG. 5, the transmission function is obtained from the lookup table. On the other hand, the processing of steps S7 to S11 of FIG. 2 can be performed instead of step S42. In other words, the calculation of transmission function for each bending amount during the imaging operation can be performed. In that case, the lookup table does not have to be stored in the memory 13. Thus, it is necessary to perform the optimization of the fiber parameter and installation coordinates.

Furthermore, in FIG. 5, obtaining the wavefront using the wavefront measurement device 7 can be performed after obtaining the transmission function. On the other hand, the wavefront using the wavefront measurement device 7 is obtained first, and the wavefront of the sample subject can be estimated from the wavefront that is obtained first by a post-processing. By performing the measurement of the wavefront and the estimation of the wavefront of the sample subject at a different timing, the processing load can be reduced. In addition, in a configuration where the estimation of the wavefront of the sample subject is performed at a different timing, the creation of the lookup table can be performed after the measurement of the wavefront.

As described above, in the present embodiment, the bending amount of the multimode fiber 2 can be estimated even if the bending amount of the multimode fiber 2 is not actually measured, and projection operation and imaging operation can be performed depending on the bending amount. By such, the projection imaging apparatus 1 in the present embodiment can be used under an in-vivo environment. Therefore, the projection imaging apparatus 1 of the present embodiment can be applied to an endoscope apparatus, etc.

The projection imaging apparatus 1 is constituted to perform both the projection operation and the imaging operation. However, the projection imaging apparatus 1 can be a projection apparatus for only performing the projection operation or can be an imaging apparatus for only performing the imaging operation. For the projection apparatus, the half mirror 10 and the wavefront measurement device 7 will be not needed. For the imaging apparatus, the half mirror 11 and the wavefront modulator 6 will be not needed.

Modification Example 1

A modification example 1 of the present embodiment 1 be explained below. In the previous embodiment, a first wavefront for measuring bending amount, a second wavefront for projection and a third wavefront for imaging are all separated by a wavelength selective coat. In the modification example 1, a wavefront is not separated by a wavelength but the wavefront is separated by polarization.

FIG. 6 is a diagram showing a constitution of one example of a projection apparatus according to a modification example 1. The previously cited paper "Seeing through chaos in multimode fibres" describes that when the circularly polarized light is inputted into the multimode fiber, the polarizing direction of the output light is not substantially changed. This modification example uses such property. As shown in FIG. 6, a projection apparatus 1a comprises a multimode fiber 2, a light source 3, a wavefront input apparatus 4, a wavefront measurement device 5, a wavefront modulator 6, a half mirror 8, a polarizing beam splitter 9a, a half mirror 11, a lens 12, a memory 13, a processor 14 and a λ/4 plate 15. On the other hand, a far-end surface of the multimode fiber 2 is provided on a polarized reflective film 16. In FIG. 6, for the constitutions added with the same reference numerals as FIG. 1, they are constitutions corresponding to FIG. 1. Therefore, the explanation will be omitted or simplified for the constitutions added to the same reference number as FIG. 1.

The polarizing beam splitter 9a is disposed a light path between the half mirror 8 and half mirror 11. The polarizing beam splitter 9a reflects only the specific linear polarized light and passes other polarized lights.

The λ/4 plate 15 is disposed a light path between the lens 12 and the near-end surface of the multimode fiber 2.

The polarized reflective film 16 reflects or passes light through depending on the polarizing direction of the input wavefront. The reflectance of the polarized reflective film 16 for the first wavefront is constituted to be greater than 0%. More specifically, when the polarizing direction of the first wavefront is a clockwise direction, the polarizing property of the polarized reflective film 16 is constituted to reflect the wavefront of the clockwise circular polarized light.

The following explains the projection operation of the projection apparatus 1a of the modification example 1. The projection operation of the projection apparatus 1a is basically performed based on the flowchart shown in FIG. 4. However, when the polarized light is used, the processing of step S32 and step S34 of FIG. 4 are simultaneously performed.

First of all, the processor 14 instructs the light source 3 to output light. With this instruction, the light source 3 outputs light. The wavelength of light output from the light source 3 does not have to be the first wavelength λ1.

Out of the light output from the light source 3, the light of the specific polarized light passes through the half mirror 8, is reflected at the polarizing beam splitter 9a and is then input to the wavefront input apparatus 4. The wavefront input apparatus 4 outputs the input light as a predetermined wavefront. This predetermined wavefront respectively reflects at the polarizing beam splitter 9a and the half mirror 8. The first wavefront reflected at the half mirror 8 passes through the λ/4 plate 15 to be a circular polarized light and is input to the near-end surface of the multimode fiber 2 as the first wavefront. The first wavefront that propagates through the multimode fiber 2 is reflected at the polarized reflective film 16 provided at the far-end surface of the multimode fiber 2. The first wavefront reflected at the polarized reflective film 16 once again propagates through the multimode fiber 2 and is output from the near-end surface of the multimode fiber 2. The first wavefront output from the near end of the multimode fiber 2 is a linear polarized light passing through λ/4 plate 15. The first wavefront passes through the lens 12 and the half mirror 8, and is input to the wavefront measurement device 5.

On the other hand, of the light output from the light source 3, the light of the polarizing component orthogonal to the light of specific polarizing component passes through the half mirror 8 and the polarizing beam splitter 9a and is input to the wavefront modulator 6. Afterwards, as explained in step S35, the processor 14 calculates modulation amount of the wavefront modulator 6 so that the wavefront having the complex amplitude of the intended projection light is output from the multimode fiber 2. Further, the processor 14 controls the modulation amount of the wavefront modulator 6 based on the calculated modulation amount.

The wavefront outputted from the wavefront modulator 6 is reflected at the half mirror 11, passes through the polarizing beam splitter 9a and also reflects at the half mirror 8. The wavefront reflected at the half mirror 8 passes through the λ/4 plate 15 to be a counterclockwise polarized light and is inputted as the second wavefront to the near-end surface of the multimode fiber 2. The second wavefront that propagates through the multimode fiber 2 passes through the polarized reflective film 16 provided at the far-end surface of the multimode fiber 2. As a result, the second wavefront is projected.

FIG. 7 is a diagram showing a constitution of one example of an imaging apparatus according to the modification example 1. As shown in FIG. 7, an imaging apparatus 1b comprises a multimode fiber 2, a light source 3, a wavefront input apparatus 4, a wavefront measurement device 5, a wavefront measurement device 7, a half mirror 8, a polarizing beam splitter 9a, a half mirror 10, a lens 12, a memory 13, a processor 14, a λ/4 plate 15, a λ/4 plate 17, and a polarizer 18. On the other hand, the far-end surface of the multimode fiber 2 is provided on a polarized reflective film 16. In FIG. 7, for the constitutions added with the same reference numerals as FIG. 1, they are constitutions corresponding to FIG. 1. Therefore, the explanation will be omitted or simplified for the constitutions added to the same reference number as FIG. 1.

The polarizing beam splitter 9a is disposed a light path between the half mirror 8 and half mirror 11. The polarizing beam splitter 9a reflects only the specific linear polarized light and passes other polarized lights.

The λ/4 plate 15 is disposed a light path between the lens 12 and the near-end surface of the multimode fiber 2.

The polarized reflective film 16 reflects or passes light through depending on the polarizing direction of the input wavefront. The reflectance of the polarized reflective film 16 for the first wavefront is constituted to be greater than 0%. More specifically, when the polarizing direction of the first wavefront is a clockwise direction, the polarized reflective film 16 is constituted to reflect the wavefront of the clockwise circular polarized light.

The λ/4 plate 17 is disposed near the far-end surface of the multimode fiber 2.

The polarizer 18 and λ/4 plate 17 constitute an optical polarization system. The polarizer 18 passes light of only the specific polarization and reflects light of other polarization.

The following explains the operation of the imaging apparatus 1b of the modification example 1. The imaging operation of the imaging apparatus 1b is basically performed based on the flowchart shown in FIG. 5. However, when the polarized light is used, the processing of step S41 and step S43 of FIG. 5 are simultaneously performed.

First of all, the processor 14 instructs the light source 3 to output light. With this instruction, the light source 3 outputs light. The wavelength of light output from the light source 3 does not have to be the first wavelength λ1.

Out of the light output from the light source 3, the light of the specific polarized light passes through the half mirror 8, is reflected at the polarizing beam splitter 9a and is then input to the wavefront input apparatus 4. The wavefront input apparatus 4 outputs the input light as a predetermined wavefront. This predetermined wavefront respectively reflects at the polarizing beam splitter 9a and the half mirror 8. The first wavefront reflected at the half mirror 8 passes through the λ/4 plate 15 to be a circular polarized light and is input to the near-end surface of the multimode fiber 2 as the first wavefront. The first wavefront that propagates through the multimode fiber 2 is reflected at the polarized reflective film 16 provided at the far-end surface of the multimode fiber 2. The first wavefront reflected at the polarized reflective film 16 once again propagates through the multimode fiber 2 and is output from the near-end surface of the multimode fiber 2. The first wavefront output from the near end of the multimode fiber 2 is a linear polarized light passing through λ/4 plate 15. The first wavefront passes through the lens 12 and the half mirror 8, and is input to the wavefront measurement device 5.

On the other hand, only the specific polarizing component of the third wavefront output from the subject passes through to the polarizer 18. The third wavefront passes through the polarizer 18 and the λ/4 plate 17 to be a counterclockwise circular polarized light, and is then input to the far-end surface of the multimode fiber 2. The third wavefront input to the multimode fiber 2 passes through the polarized reflective film 16 to propagate through the multimode fiber 2 and is output from the near-end surface of the multimode fiber 2. The third wavefront output from the near end of the multimode fiber 2 is a linear polarized light passing through λ/4 plate 15. This third wavefront reflects at the half mirror 8, passes through the polarizing beam splitter 9a, and reflects at the half mirror 10 to input to the wavefront measurement device 7.

After, the processor 14 estimates the wavefront of the sample subject from the transmission function obtained in step S42 and the complex amplitude of the wavefront obtained from the wavefront measurement device 7.

As explained in modification example 1, the first wavefront and the second wavefront can be separated by polarization instead of wavelength. By the above, the obtaining of the transmission function and the projection can be simultaneously performed based on the bending amount of the multimode fiber 2. Further, in the modification example 1, the first wavefront and the third wavefront can be separated by the polarization and not the wavelength. By the above, the obtaining of the transmission function and the imaging can be simultaneously performed based on the bending amount of the multimode fiber 2.

Modification Example 2

A modification example 2 of the present embodiment will be explained below. In the aforementioned embodiment and modification example 1, the multimode fiber for bending measurement and the multimode fiber for projection operation or imaging operation are shared. The modification example 2 is an example of individually providing a first multimode fiber for bending measurement and a second or third multimode fiber for projection or imaging.

FIG. 8 is a diagram showing a first configuration example of multimode fiber 2 according to the modification example 2. In an example of FIG. 8, the multimode fiber 2 comprises a single multimode fiber 2a for bending measurement and a single multimode fiber 2b for projection or imaging. The multimode fiber 2a and the multimode fiber 2b are disposed in parallel and are bundled. Further, FIG. 8 is an example of the projection apparatus or the imaging apparatus. For the projection imaging apparatus, the multimode fiber 2b is constituted by two multimode fibers bundled with the multimode fiber 2a.

In the constitution of FIG. 8, the multimode fiber 2a and the multimode fiber 2b are not bent due to high rigidity in the parallel direction and only bend in the direction orthogonal to the parallel direction, as indicated by the bending direction in the drawings. Since the multimode fiber 2a and the multimode fiber 2b are bundled, the bending amount of the multimode fiber 2a and the multimode fiber 2b will be the same. Therefore, the bending amount measured at the multimode fiber 2a can be used as the bending amount of the multimode fiber 2b.

Since the fiber parameter and the installation position differ between the multimode fiber 2a and the multimode fiber 2b, the lookup table prepared using the multimode fiber 2a cannot be used as it is. In other words, it is necessary to prepare a lookup table for the multimode fiber 2b. The method of creating the lookup table is the same as FIG. 2 except that the fiber parameters etc. to be used are those of the multimode fiber 2b.

FIG. 9 is a diagram showing a second configuration example of the multimode fiber 2 of the modification example 2. In an example of FIG. 9, the multimode fiber 2 comprises two multimode fibers 2a for bending measurement and a single multimode fiber 2b for projection or imaging. The multimode fiber 2b is disposed in parallel to be interposed between the multimode fibers 2a. Furthermore, the multimode fibers 2a and the multimode fiber 2b are not bundled which is different from the example of FIG. 8. Further, FIG. 9 is an example of the projection apparatus or the imaging apparatus. For the projection imaging apparatus, the multimode fiber 2b is constituted by two multimode fibers.

In the constitution of FIG. 9, the multimode fibers 2a and the multimode fiber 2b are not bundled, and the two multimode fibers 2a and the multimode fiber 2b can be bent in any direction of parallel and its orthogonal directions. However, in the example of FIG. 9, there is a possibility that the bending amount of two multimode fibers 2a will not be the bending amount of the multimode fiber 2b. In order to accurately obtain the bending amount of the multimode fiber 2b, the intervals between each of the two multimode fibers 2a and the multimode fiber 2b are considered, and the bending amount of the multimode fiber 2b need to be those that are weighted with the bending amounts of the two multimode fibers 2a. For example, if the intervals between each of the two multimode fibers 2a and the multimode fiber 2b are equal, the bending amount of the multimode fiber 2b will be an average value of the bending amounts of the two multimode fibers 2a.

In the modification example 2 explained above, there is no need to separate the light for bending measurement and the light for projection operation or imaging operation by wavelength or change the polarization direction since the multimode fiber for bending amount measurement and the multimode fiber for projection operation or imaging operation are individually provided.

Modification Example 3

A modification example 3 of the present embodiment will be explained below. FIG. 10 is a diagram showing a configuration of a multimode fiber 2 of modification 3. In the aforementioned embodiment and modification examples 1 and 2, a single multimode fiber is used to perform the projection operation or the imaging operation. In this case, for example, the light of RGB propagates through as light in different propagation modes through one multimode fiber. On the other hand, FIG. 10 is an example of individually passing the R, G, B lights using three multimode fibers. More specifically, in FIG. 10, a multimode fiber R for transmission of R light, a multimode fiber G for transmission of G light, and a multimode fiber B for transmission of B light are disposed so each of the fibers are at a position of an apex of the equilateral triangle. Further, although not shown in FIG. 10, a multimode fiber for bending measurement as shown in FIG. 9 is arranged adjacent to each of multimode fibers R, G, B. Naturally, the light for bending amount measurement and the light for projection operation or imaging operation can be separated by wavelength by providing the wavelength selective coat on the far-end of respective multimode fibers R,G,B, or the light for bending amount measurement and the light for projection operation or imaging operation can be separated by polarization by providing a polarized reflective film on the far-end surface of the respective multimode fibers R, G, B.

In addition, the wavelengths of light that propagate through multimode fibers R, G, B differ; therefore, it is necessary to individually calculate the transmission function of the multimode fibers R, G, B.

Further, in the case shown in FIG. 10, if the coordinates of apexes of the triangle and intervals between each of multimode fibers are known, the remaining bending amount can be calculated from the bending amount of the two multimode fibers obtained by measurements.

Additional advantages and modifications will readily occur to those skilled in the art. Therefore, the embodiments in its broader aspects are not limited to the specific details and representative embodiments shown and described herein. Accordingly, various modifications may be made without departing from the spirit or scope of the general inventive concept as defined by the appended claims and their equivalents.

The invention claimed is:

1. A bending measurement apparatus comprising:
   a first multimode fiber;
   a wavefront input apparatus configured to input a first wavefront to the first multimode fiber as an input wave front;
   a first wavefront measurement device configured to measure an output wavefront outputted from the first multimode fiber by propagating through the first multimode fiber as a measured wavefront; and
   a processor configured to:
      select correspondence information which corresponds to the measured wavefront from correspondence information, the correspondence information showing a correspondence relationship between the input wavefront and the output wavefront, and the correspondence information obtained for each bending amount of the first multimode fiber; and
      set the bending amount corresponding to the selected correspondence information as a current bending amount of the first multimode fiber.

2. The bending measurement apparatus according to claim 1, further comprising:
   a memory configured to store the correspondence information for each bending amount of the first multimode fiber as a lookup table,
   wherein the processor configured to:
      select the correspondence information corresponding to the measured wavefront from the correspondence information stored as the lookup table; and
      set the bending amount corresponding to the selected correspondence information as the current bending amount of the first multimode fiber.

3. The bending measurement apparatus according to claim 1, further comprising:
   a memory configured to store known parameters including a length, core diameter, clad diameter, refractive index distribution, position information of a modeled first multimode fiber,
   wherein the processor configured to:
      calculate the correspondence information for each bending amount based on the known parameters;
      select the correspondence information corresponding to the measured wavefront from the correspondence information for each calculated bending amount; and
      set the bending amount corresponding to the selected correspondence information as the current bending amount of the first multimode fiber.

4. The bending measurement apparatus according to claim 2, wherein the correspondence information for each bending amount is an output wavefront for each bending amount of when the first wavefront is input to the first multimode fiber as the input wavefront, and
   wherein the processor is configured to:
      select the output wavefront corresponding to the measured wavefront from the output wavefront for each bending amount; and
      set the bending amount corresponding to the selected output wavefront as the current bending amount of the first multimode fiber.

5. The bending measurement apparatus according to claim 2, wherein the correspondence information for each bending amount is a transmission function of each bending amount of when the first wavefront is input to the first multimode fiber as the input wavefront,
   wherein the processor is configured to:
      calculate a transmission function from the measured wavefront;
      select a transmission function corresponding to the transmission function calculated from the transmission function of each bending amount; and
      set the bending amount corresponding to the selected transmission function as the current bending amount of the first multimode fiber.

6. The bending measurement apparatus according to claim 1, wherein the first multimode fiber is configured such that a reflectance of a second end face different from the first end face to which the first wavefront is input is higher than 0% with respect to a wavelength of the first wavefront.

7. A projection apparatus comprising:
a bending measurement apparatus according to claim 1,
a second multimode fiber to which a second wavefront is input; and
a wavefront modulator configured to modulate the second wavefront, wherein,
the second multimode fiber is configured to output the second wavefront from a second end face different from the first end face to which the second wavefront is input, and
the wavefront modulator is configured to modulate the second wavefront based on a set bending amount of the first multimode fiber.

8. The projection apparatus according to claim 7, wherein the first multimode fiber and the second multimode fiber are the same multimode fiber.

9. The projection apparatus according to claim 8, wherein a polarizer is provided on the second end surface,
each of the first wavefront and the second wavefront is circular polarized light, and a poririzing direction of the first wavefront is orthogonal to a poririzing direction of the second wavefront.

10. The projection apparatus according to claim 8, wherein the second end surface is provided with a wavelength selective coat for selectively reflecting a wavefront having a wavelength of the first wavefront.

11. The projection apparatus according to claim 10, wherein each of the first wavefront and the second wavefront is circular polarized light and a poririzing direction of the first wavefront is orthogonal to a poririzing direction of the second wavefront.

12. The projection apparatus according to claim 7, wherein the first multimode fiber and the second multimode fiber are disposed adjacent to each other.

13. An imaging apparatus comprising:
a bending measurement apparatus according to claim 1;
a third multimode fiber to which a wavefront from a subject is input; and
a second wavefront measurement device configured to measure a wavefront from the subject that propagated through the third multimode fiber,
wherein the processor is configured to calculate a wavefront from the subject from the wavefront measured at the second wavefront measurement device based on a set bending amount of the first multimode fiber.

14. The imaging apparatus according to claim 13, wherein the first multimode fiber and the third multimode fiber are the same.

15. The imaging apparatus according to claim 13, wherein an optical polarization system is provided on a subject side of the first multimode fiber,
the first wavefront is a circular polarized light,
the optical polarization system sets a polarization property so that a wavefront from the subject is circularly polarized light having a polarization direction orthogonal to a polarization direction of the first wavefront.

16. The imaging apparatus according to claim 15, wherein a second end surface which is on the subject side of the first multimode fiber is provided with a wavelength selective coat for selectively reflecting a wavefront having a wavelength of the first wavefront.

17. A projection imaging apparatus comprising:
a bending measurement apparatus according to claim 1;
a second multimode fiber to which a second wavefront is input; and
a wavefront modulator configured to modulate the second wavefront;
a third multimode fiber to which a wavefront from a subject is input; and
a second wavefront measurement device configured to measure a wavefront from the subject that propagated through the third multimode fiber,
wherein the second multimode fiber is configured to output the second wavefront from a second end face different from the first end face to which the second wavefront is input, and
the wavefront modulator is configured to modulate the second wavefront based on a set bending amount of the first multimode fiber, and
the processor is configured to calculate a wavefront from the subject from the wavefront measured at the second wavefront measurement device based on the set bending amount of the first multimode fiber.

18. A bending measuring method comprising:
inputting a first wavefront to a first multimode fiber as a first input wavefront;
measuring a wavefront which propagated through the first multimode fiber as a first measured wavefront;
calculating correspondence information based on first known parameters, the correspondence information showing a correspondence relationship between an input wavefront and an output wavefront for each bending amount, and the first known parameters including a length, core diameter, clad diameter, refractive index distribution, and position information of a modeled first multimode fiber;
selecting first correspondence information which corresponds to the first measured wavefront from the correspondence information for each calculated bending amount;
calculating a transmission function of each bending amount based on second known parameters which sets a bending amount corresponding to the first correspondence information as a first current bending amount of the first multimode fiber;
inputting a first wavefront to a first multimode fiber as a second input wavefront;
measuring a wavefront which propagated through the first multimode fiber as a second measured wavefront;
selecting second correspondence information corresponding to the second measured wavefront from the correspondence information for each calculated bending amount; and
setting the bending amount corresponding to the second correspondence information as a second current bending amount of the first multimode fiber.

* * * * *